June 15, 1971 R. J. BROERSMA 3,584,411
CUTTING MAKING MACHINE
Filed July 22, 1969 13 Sheets-Sheet 1

INVENTOR.
ROBERT J. BROERSMA
BY
Woodhams, Blanchard & Flynn
ATTORNEYS

INVENTOR.
ROBERT J. BROERSMA
BY
Woodhams, Blanchard & Flynn
ATTORNEYS

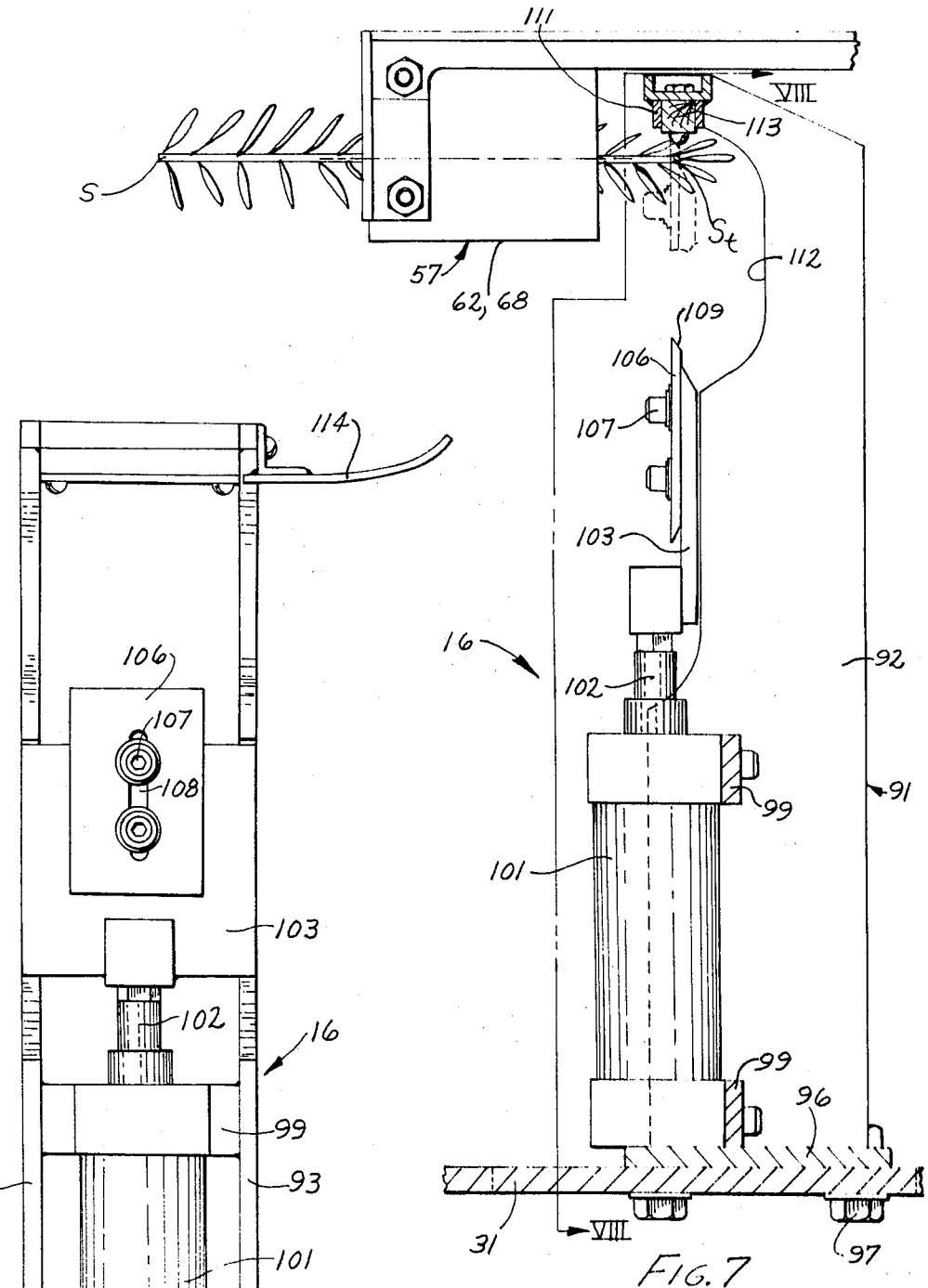

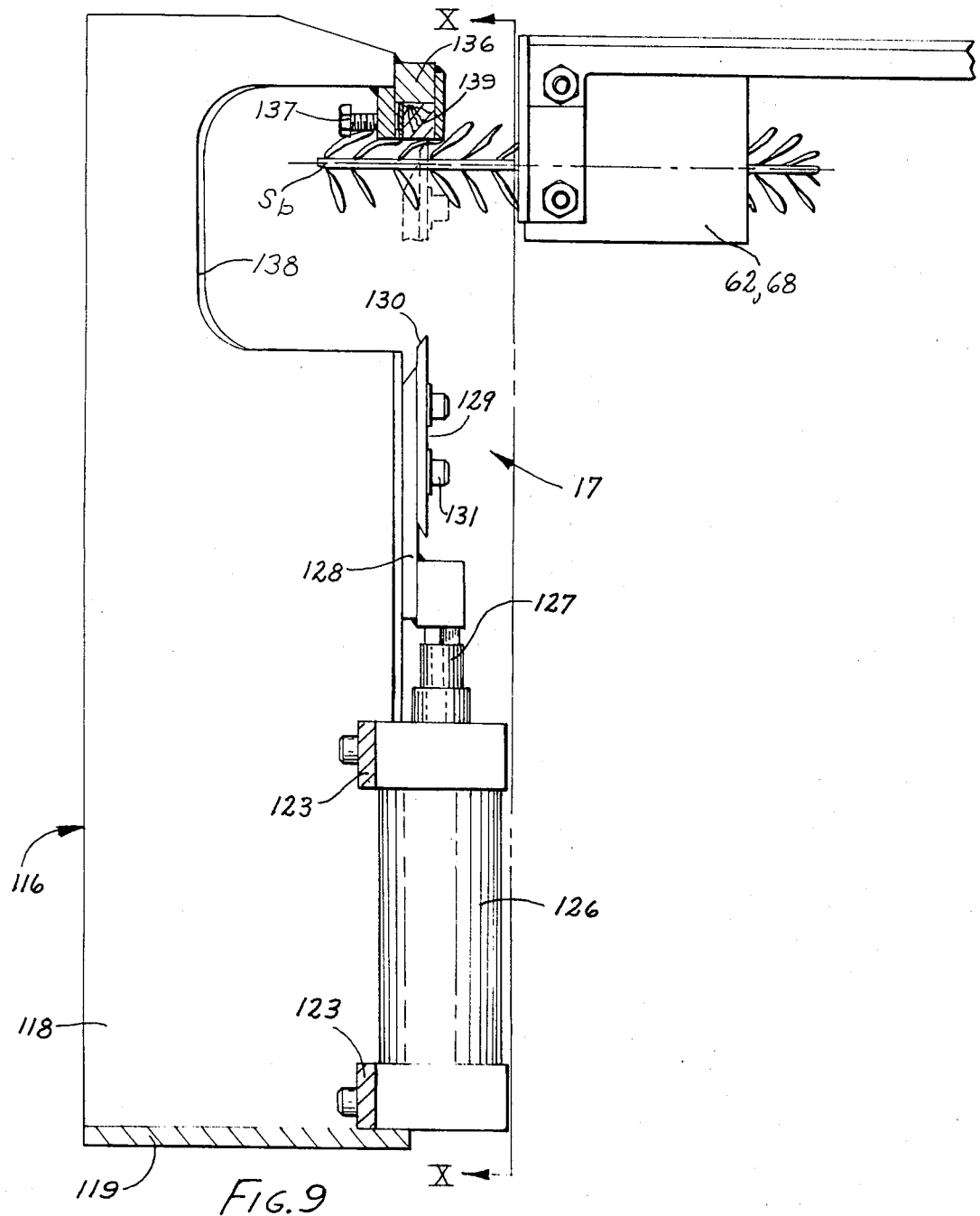

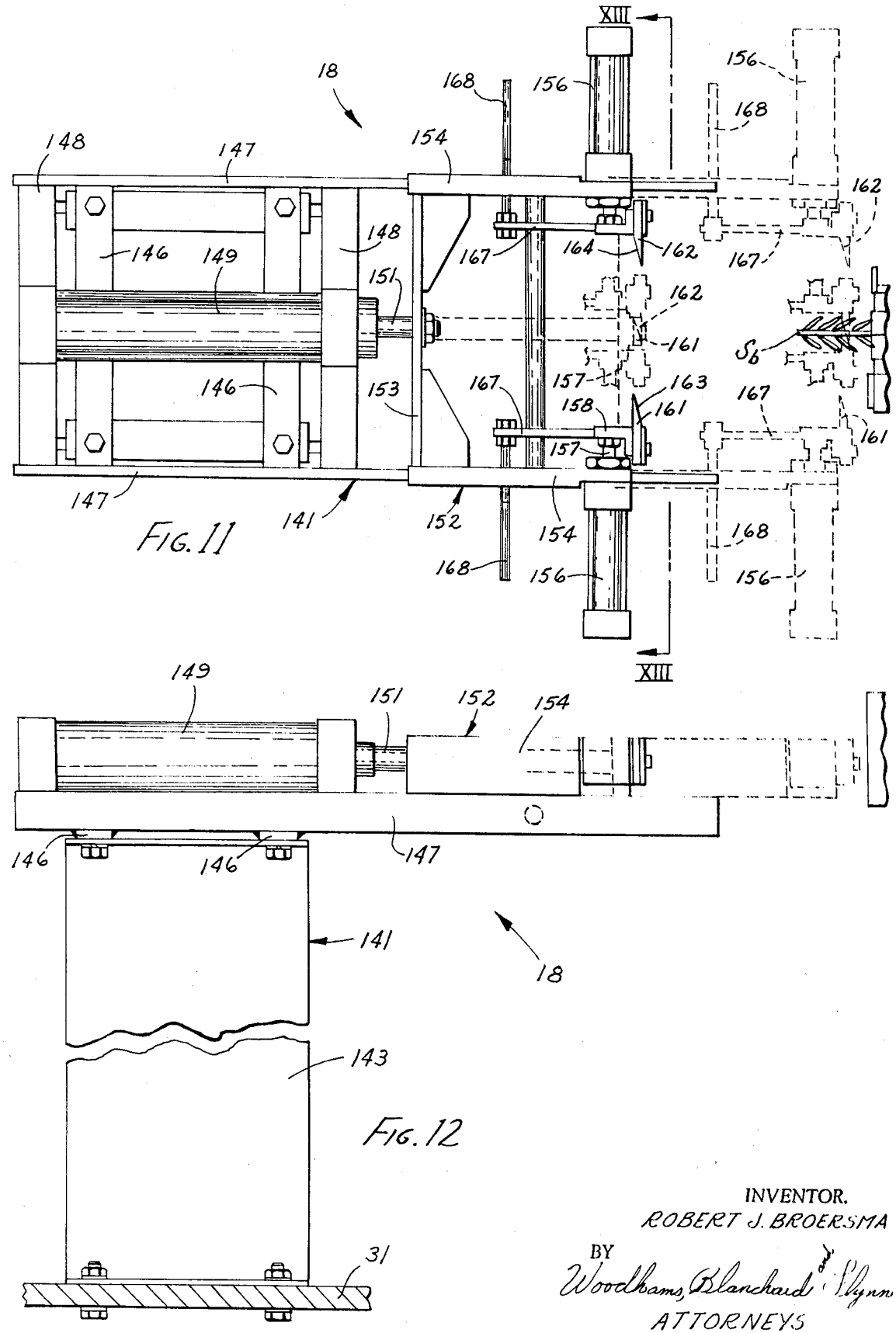

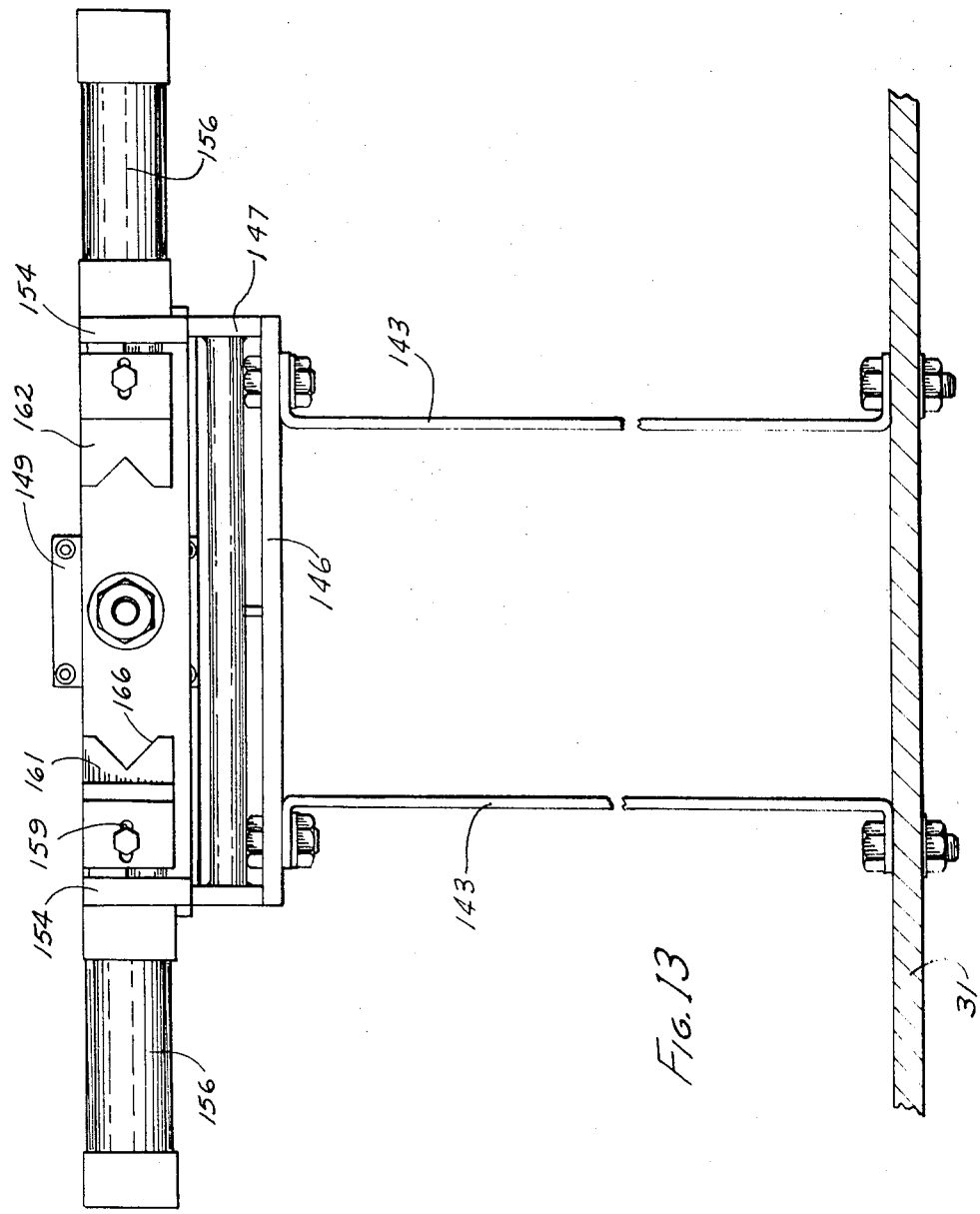

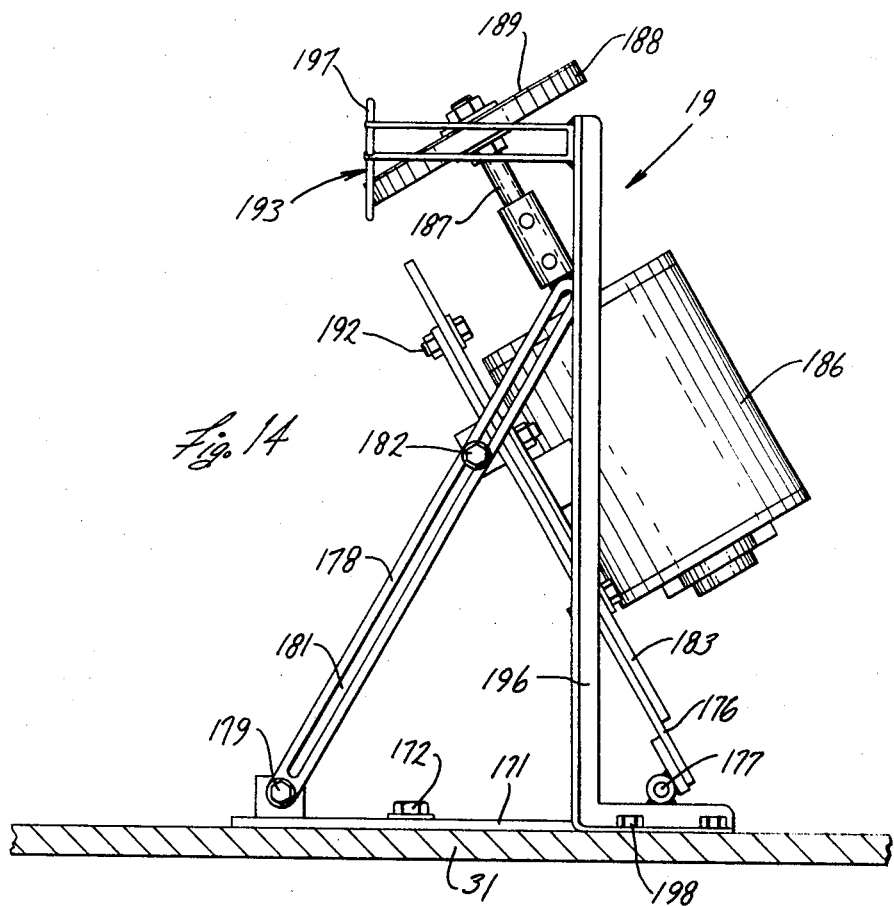
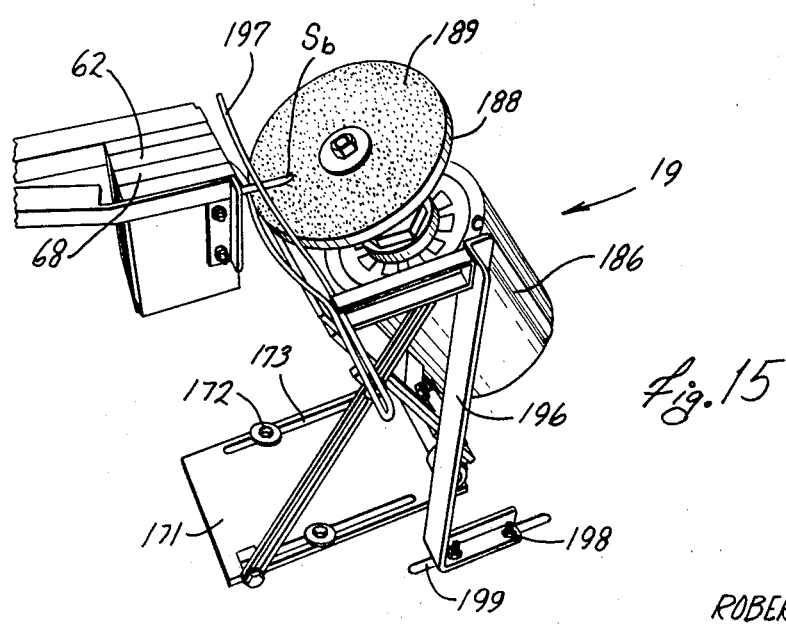

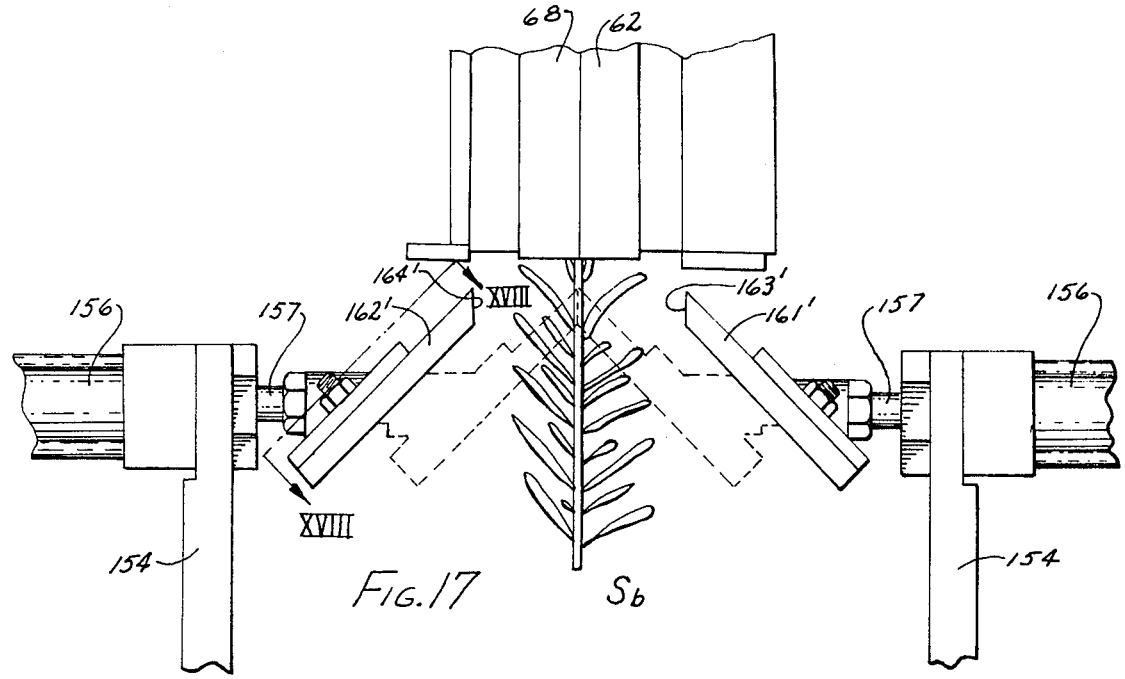
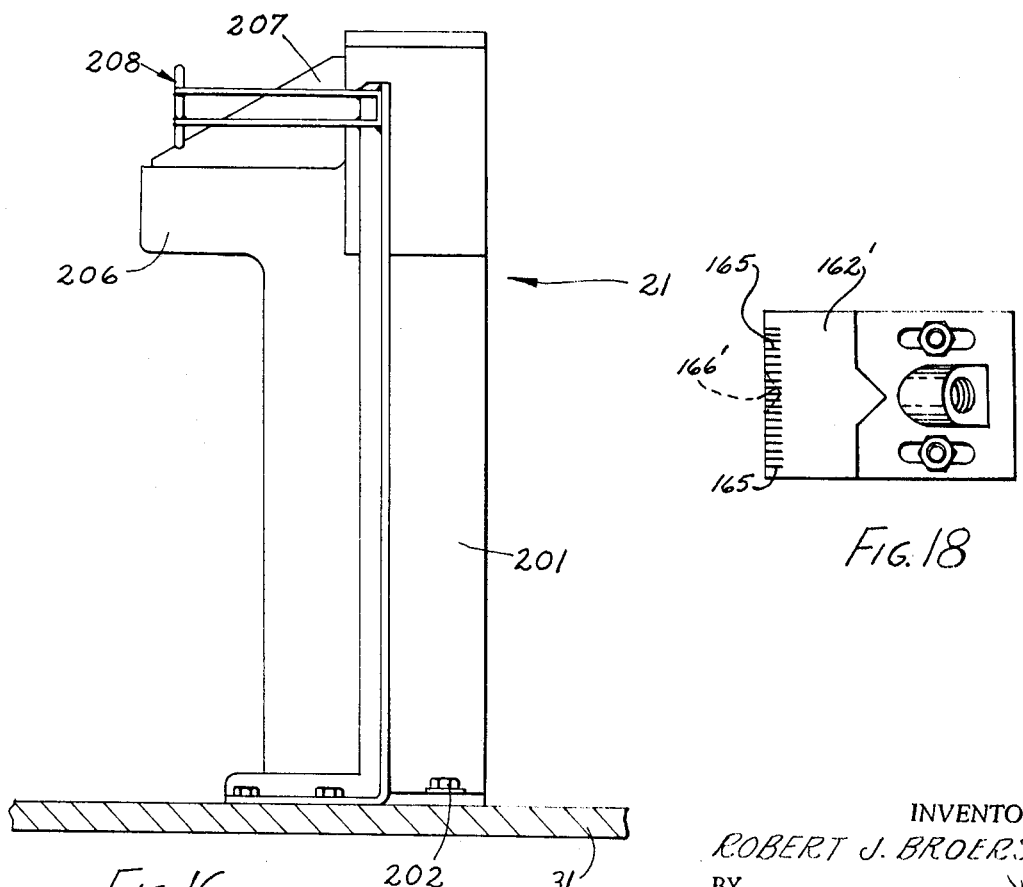

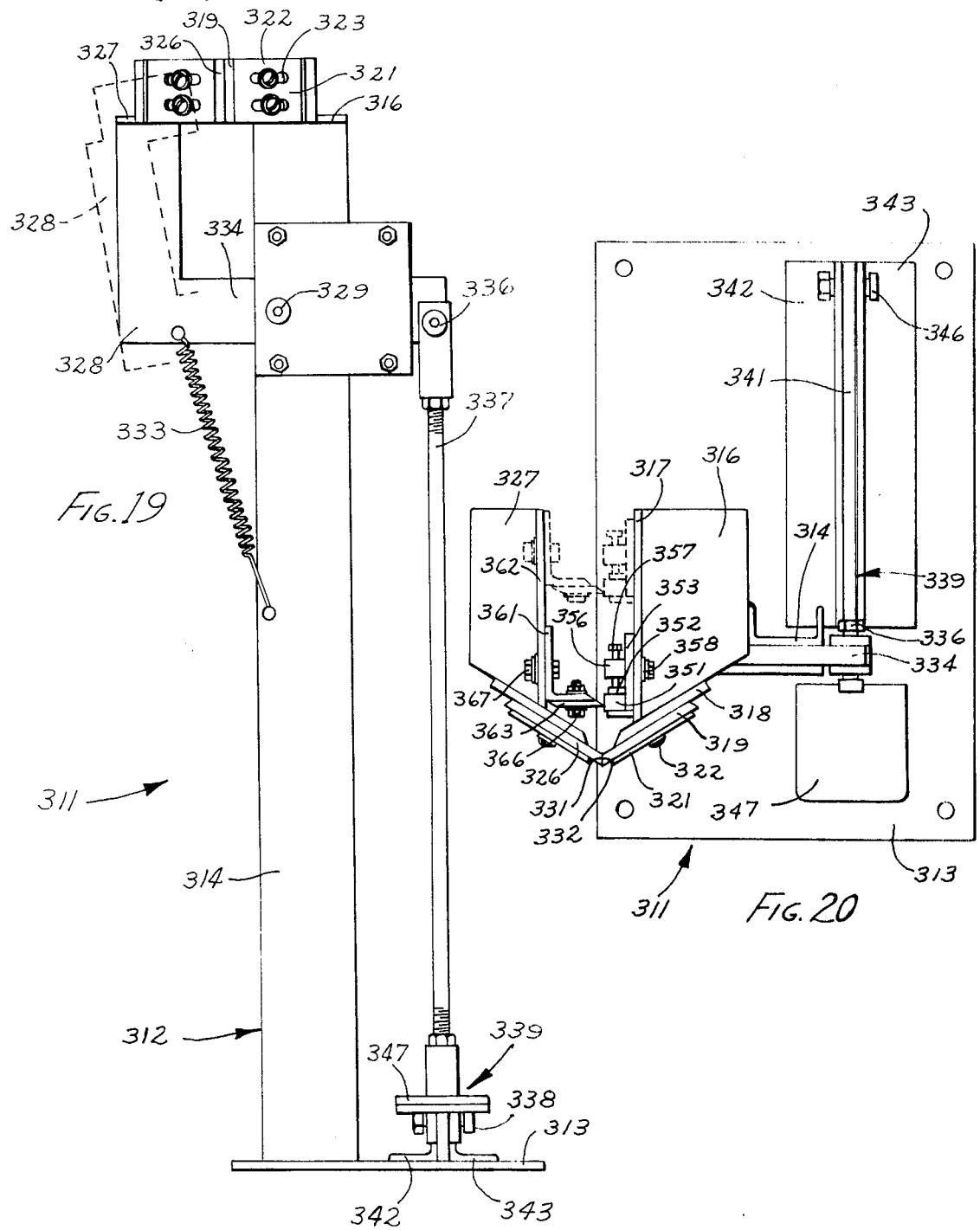

United States Patent Office 3,584,411
Patented June 15, 1971

3,584,411
CUTTING MAKING MACHINE
Robert J. Broersma, Spring Lake, Mich., assignor to Royer Foundry and Machine Co., Kingston, Pa.
Filed July 22, 1969, Ser. No. 843,396
Int. Cl. A01g 3/00
U.S. Cl. 47—1                                    14 Claims

ABSTRACT OF THE DISCLOSURE

An apparatus for preparing nursery cuttings for planting. The apparatus, one embodiment, includes a rotable clamping structure which is successively indexed to a plurality of stations for permitting both the top and bottom of the cutting to be trimmed, the bottom or stem then being stripped of foliage and wounded. The apparatus then, if desired, applies a hormone solution to the wounded stem after which the prepared cutting is discharged from the apparatus for further handling as desired, such as by being planted in the ground or in a container containing planting media.

FIELD OF THE INVENTION

This invention relates to an apparatus for preparing nursery cuttings and, in particular, relates to a machine which in a preferred embodiment has a rotatable clamping structure for permitting a cutting to be automatically trimmed, stripped of foliage, wounded and, if desired, treated with a hormone solution whereby the cutting is in suitable condition for insertion into planting media.

BACKGROUND OF THE INVENTION

Most nurseries generally start new plants, shrubs and trees by utilizing cuttings or trimmings taken from mature plants, shrubs or trees, which cuttings are suitably prepared and inserted either into the ground or into a container containing planting media therein, such as soil or peat moss, whereupon the prepared cutting then develops a suitable root system of its own. Flowering plants such as azaleas, poinsettias, geraniums and mums, as well as evergreen trees and shrubs such as of the Juniperus and Taxus genus, are frequently started in this manner.

At the present time, the operation of preparing and planting the cuttings is performed almost entirely manually. This necessarily is an inefficient and undesirable operation since the amount of manual labor involved is undesirably high, thereby resulting in such an operation being undesirably costly. Further, since this phase of the nursery business is generally seasonal, it usually requires part time or seasonal help, which is in many instances difficult to obtain, particularly in the often very large amounts needed for relatively short periods.

Further, manual preparation of the cuttings also results in a lack of uniformity among the cuttings and also often results in substantial damage to the cuttings. For example, the manual preparation of a cutting often results in the cuttings being of somewhat different lengths. Further, such a manual operation does not necessarily result in the most desirable cut on the stem portion of a cutting since many plants or shrubs have been found to root more easily if the stem portion is cut at a certain slant or angle, which angle is often not uniformly obtained when the stem portion of the cutting is trimmed manually.

During preparation of the cutting, it is also necessary to strip away the foliage, such as needles or leaves, which is adjacent the stem of the cutting. This operation is generally performed by manually scraping away such excess leaves or needles, as by utilizing a knife or similar scraping device. This is not only a time-consuming operation, but it also often results in undesirable damage to the cutting.

Accordingly, it is an object of this invention:
(1) To provide an apparatus for automatically preparing nursery cuttings for planting.
(2) To provide an apparatus, as aforesaid, for trimming and stripping the stem end of a cutting.
(3) To provide an apparatus, as aforesaid, which also trims the upper end of the cutting for producing cuttings of predetermined length.
(4) To provide an apparatus, as aforesaid, which also wounds the stem end of the cutting and, if desired, automatically applies a hormone, or other appropriate, solution thereto.
(5) To provide an apparatus, as aforesaid, which permits the rapid and efficient preparation of uniform cuttings without damaging same.
(6) To provide an apparatus, as aforesaid, which is adjustable to permit the preparation of cuttings of predetermined and selected lengths, which is adjustable to permit the stem to be cut at a selected angle, which is adjustable to permit variation in the stripping length of the stem, and which is adjustable to permit the stem of the cutting to be wounded at a selected position and at a selected angle.
(7) To provide an apparatus, as aforesaid, which includes a rotatable clamping mechanism which is successively indexed to a plurality of positions for permitting insertion of the cutting into the machine, trimming the top of the cutting, trimming the stem of the cutting, stripping the stem of the cutting, wounding the stem of the cutting, applying where desired a hormone solution to the stem of the cutting, and then discharging the cutting from the clamping mechanism so that same can be inserted into suitable planting material.
(8) To provide an apparatus, as aforesaid, which permits the above steps to be sequentially and automatically performed for permitting the preparation of large quantities of substantially uniform cuttings.

Other objects and purposes of this invention will be apparent to persons acquainted with apparatus of this general type upon reading the following specification and inspecting the accompanying drawings.

BRIEF DESCRIPTION OF THE DRAWINGS

FIG. 7 is an elevational view, partially in cross section, taken substantially along the line VII—VII of FIG. 2.

FIG. 8 is a side elevational view of FIG. 7 taken substantially along the line VIII—VIII of FIG. 7.

FIG. 9 is an elevational view, partially in cross section, taken substantially along the line IX—IX of FIG. 2.

FIG. 11 is an enlarged top view of the stripper device.

FIG. 12 is a side elevational view of the stripper device illustrated in FIG. 11.

FIG. 13 is an elevational view taken substantially along the line XIII—XIII of FIG. 11.

FIG. 14 is an elevational view taken substantially along the line XIV—XIV of FIG. 2.

FIG. 15 is a perspective view of the wounding device illustrated in FIG. 14.

FIG. 16 is a side elevational view taken substantially along the line XVI—XVI of FIG. 2.

FIG. 17 illustrates a modified configuration of the stripper jaws.

FIG. 18 is an elevational view taken along the line XVIII—XVIII of FIG. 17.

FIG. 19 is a front elevational view of a modified device for cutting and stripping the stem portion of a cutting.

FIG. 20 is a top view of the device illustrated in FIG. 19.

Figure 1:
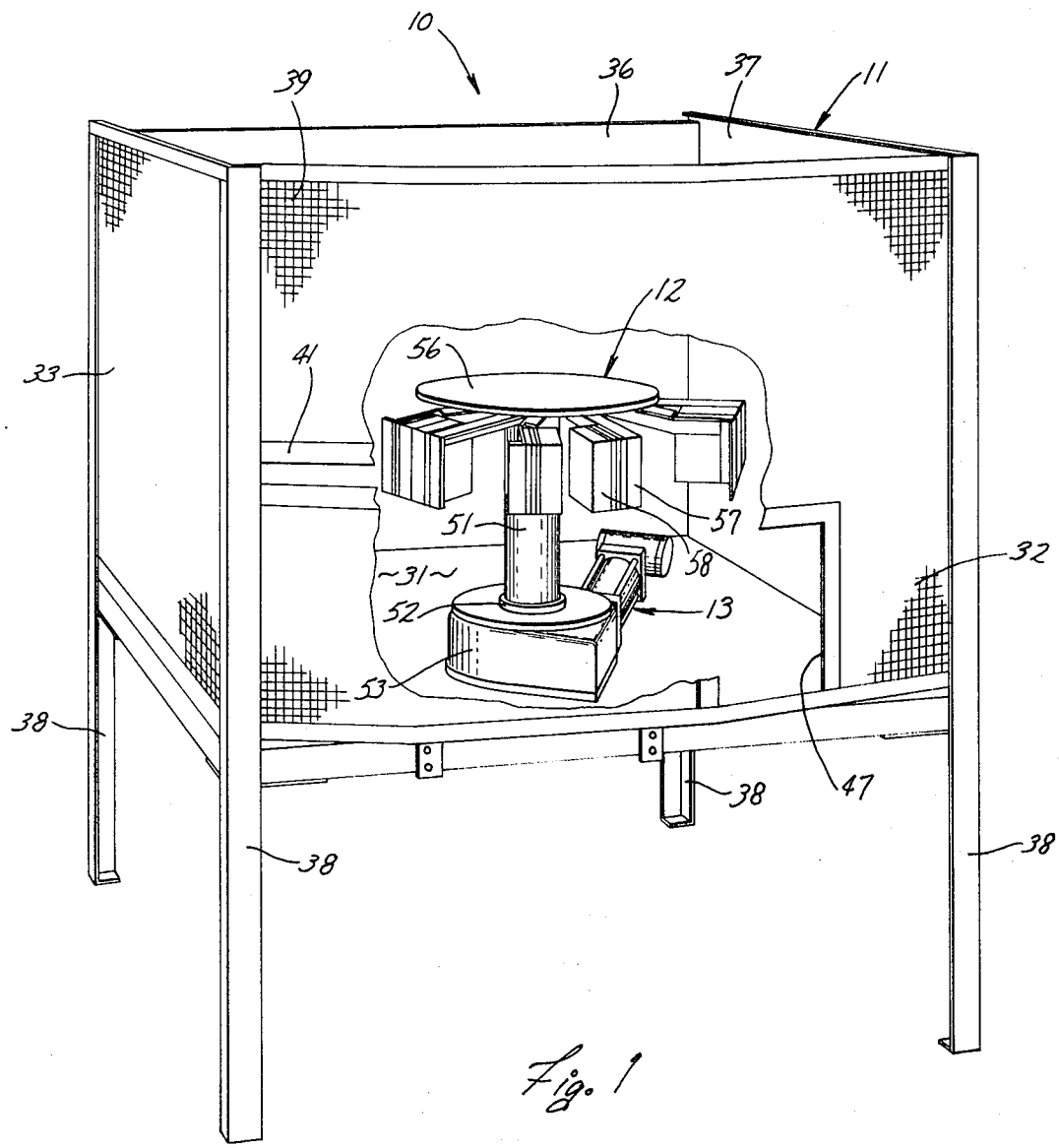
FIG. 1 is a perspective view of a cutting making machine constructed in accordance with the present invention, same being illustrated with the cutting stripping and wounding devices removed for purposes of clarity.

Certain terminology will be used in the following description for convenience in reference only and will not be limiting. The words "upwardly," "downwardly," "rightwardly" and "leftwardly" will designate directions in the drawings to which reference is made. The word "forwardly" will refer to the normal direction of rotation of the clamping structure of the cutting making machine during operation, which rotational direction is clockwise in FIG. 2. The words "inwardly" and "outwardly" will refer to directions toward and away from, respectively, the geometric center (and the rotational axis) of the device and designated parts thereof. Said terminology will include the words above specifically mentioned, derivatives thereof and words of similar import.

Further, the nursery trade often refers to a cutting from a plant or shrub as a "spike," and this terminology will be utilized throughout the following description to avoid confusion with the actual cutting and trimming operations which are performed in the apparatus of the present invention.

SUMMARY OF THE INVENTION

In general, the objects and purposes of this invention are met by providing a rotatable clamping structure which includes a plurality of pairs of clamping jaws thereon, each pair of clamping jaws being adapted to receive a spike therebetween with the opposite ends of the spike extending beyond the clamping jaws. An intermittent drive means is interconnected to the clamping structure to rotatably index same successively through a plurality of working stations. A spike is initially inserted between a pair of open clamping jaws, which jaws are then moved to the closed position as the clamping mechanism is rotatably stepped to a first working station. Positioned adjacent the first working station is a top cutting device which causes the top of the spike to be cut. The rotatable clamping mechanism is then stepped to a second working station. A bottom cutting device is positioned adjacent the second working station and is automatically energized to cut the bottom or stem of the spike, the bottom cutting device being either fixed or selectively positionable, as desired, to permit the spike to be cut at a desired angle and to a predetermined length. The clamping mechanism is again rotatably moved to a further working station, which station is provided with a stripping device which includes a pair of stripping jaws which move into surrounding engagement with the stem of the spike, whereupon the stripping jaws are moved outwardly to remove any leaves or needles present on the stem of the spike.

The rotatable clamping device is then rotatably stepped to a further station which has an adjustable wounding device positioned closely adjacent the path of movement of the spike. The wounding device includes an abrasive member, such as an abrasive disk, which contacts the stem portion of the spike to cause a wounding thereof, that is, the abrasive disk causes the removal of a portion of the bark or skin of the spike.

The clamping mechanism is again rotatably stepped to another station at which is positioned a tank containing a supply of any desired treating material, such as a liquid hormone solution. An absorbent member extends into the tank and also extends into the path of movement of the stem whereupon the stem contacts the absorbent member, causing the application of treating material to the wounded portion of the stem. The clamping mechanism is then rotatably stepped to a discharge station whereupon the clamping jaws are opened to permit the spike to be dropped, the prepared and treated spike then being manually removed from the apparatus.

DETAILED DESCRIPTION

FIGS. 1–16 illustrate therein a cutting making machine 10 constructed according to the present invention. The machine 10 includes a frame 11 (FIG. 1) having a rotatable turret-like clamping mechanism 12 mounted thereon, which mechanism 12 is rotatably indexed by a conventional drive means 13.

Figure 2:
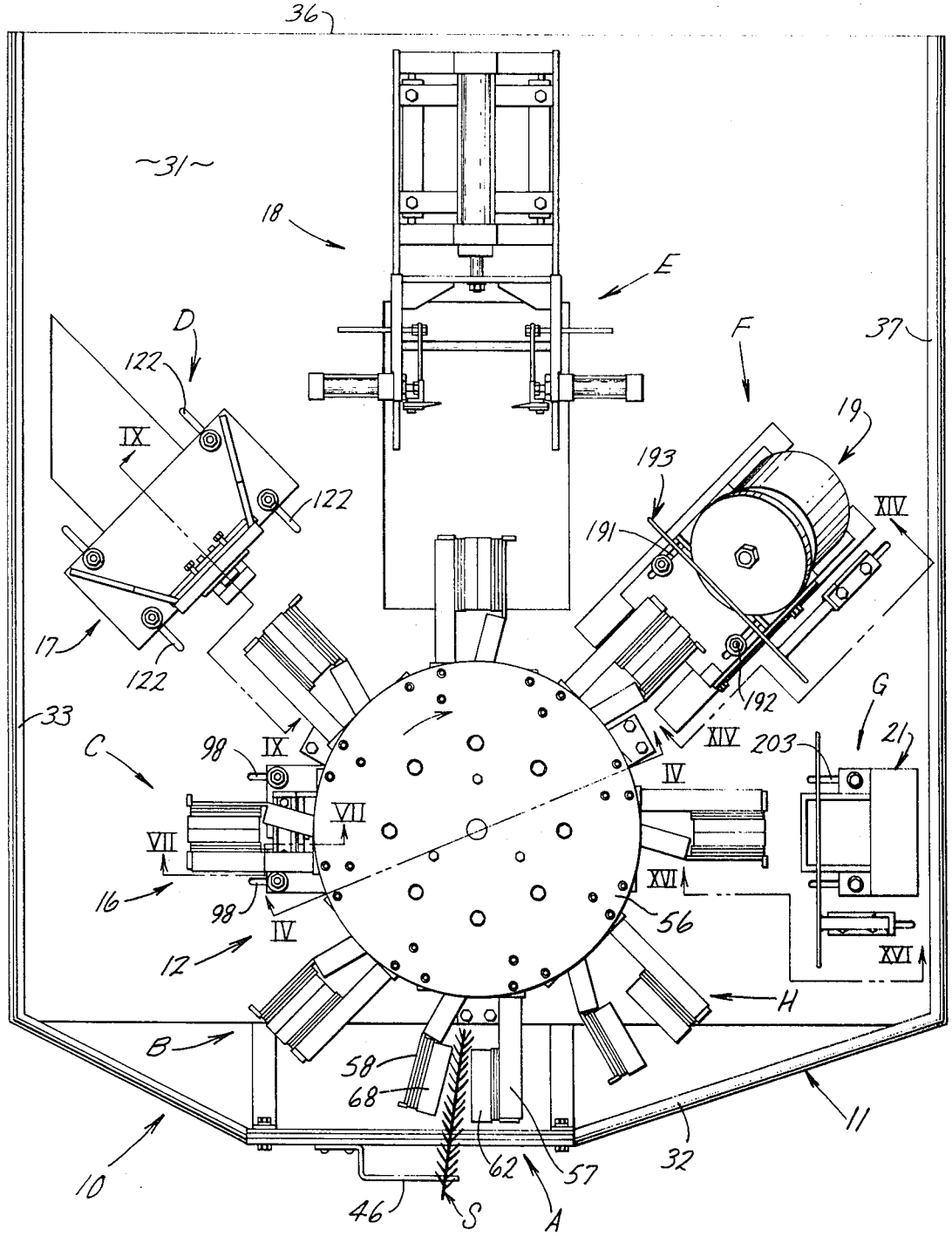
FIG. 2 is a top view of the machine illustrated in FIG. 1.
Figure 3:
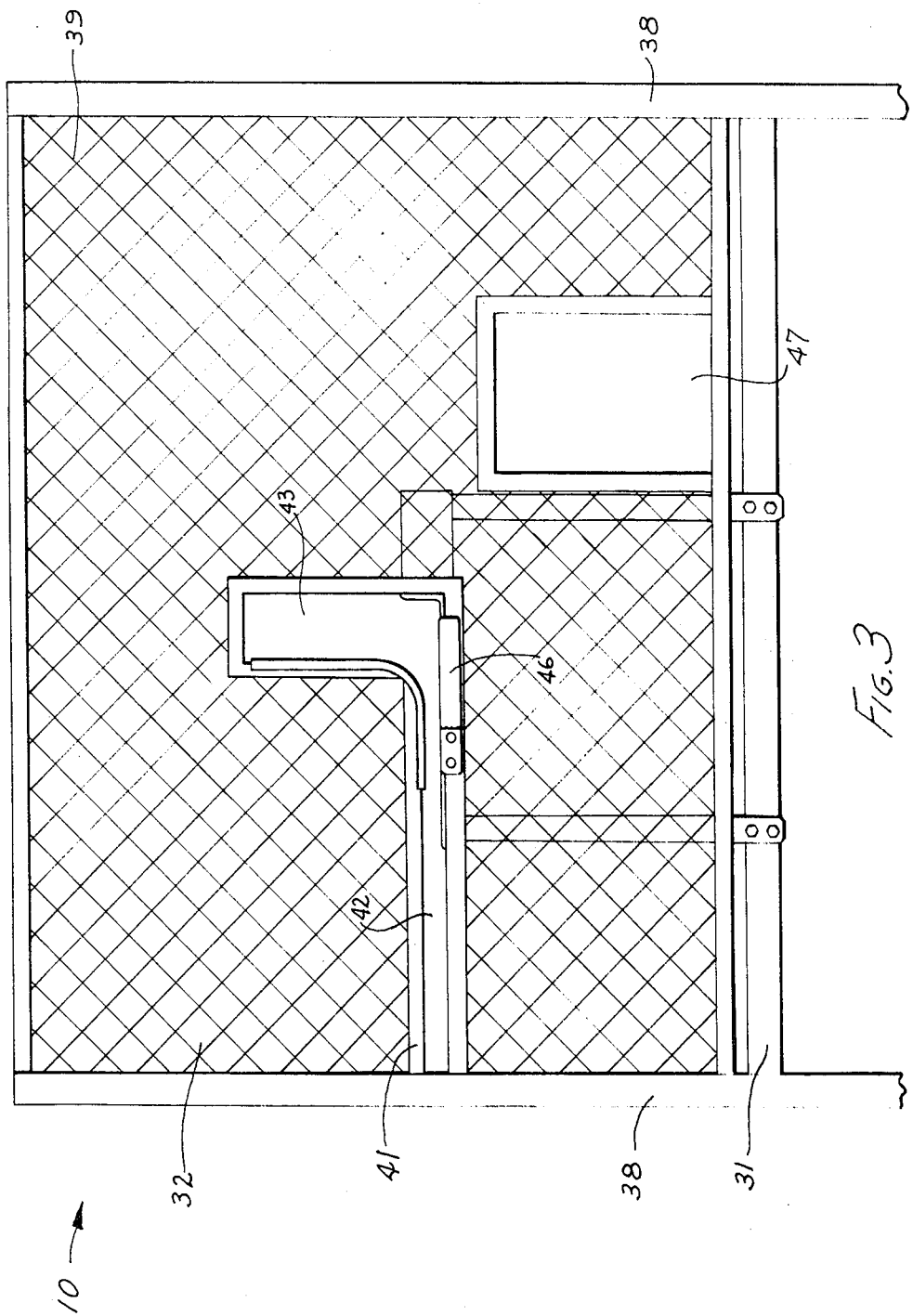
FIG. 3 is a front elevational view of the machine illustrated in FIG. 1.
Figure 4:
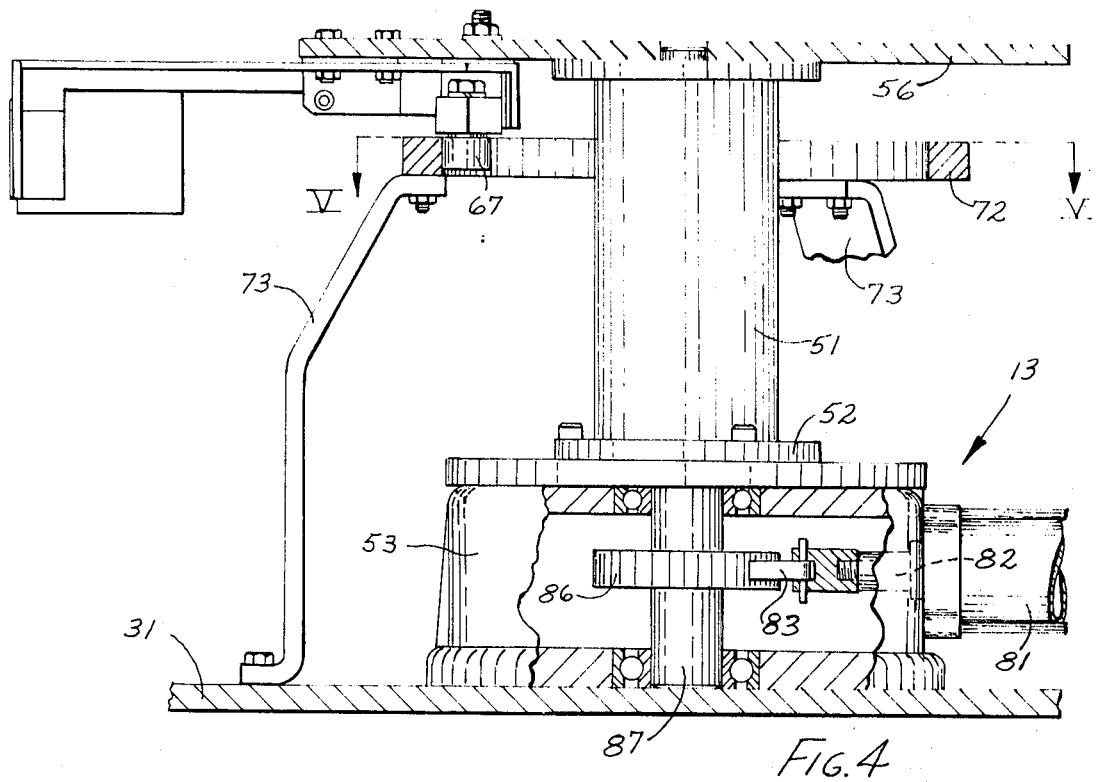
FIG. 4 is an elevational view, partially in cross section, taken substantially along the line IV—IV of FIG. 2.
Figure 5:
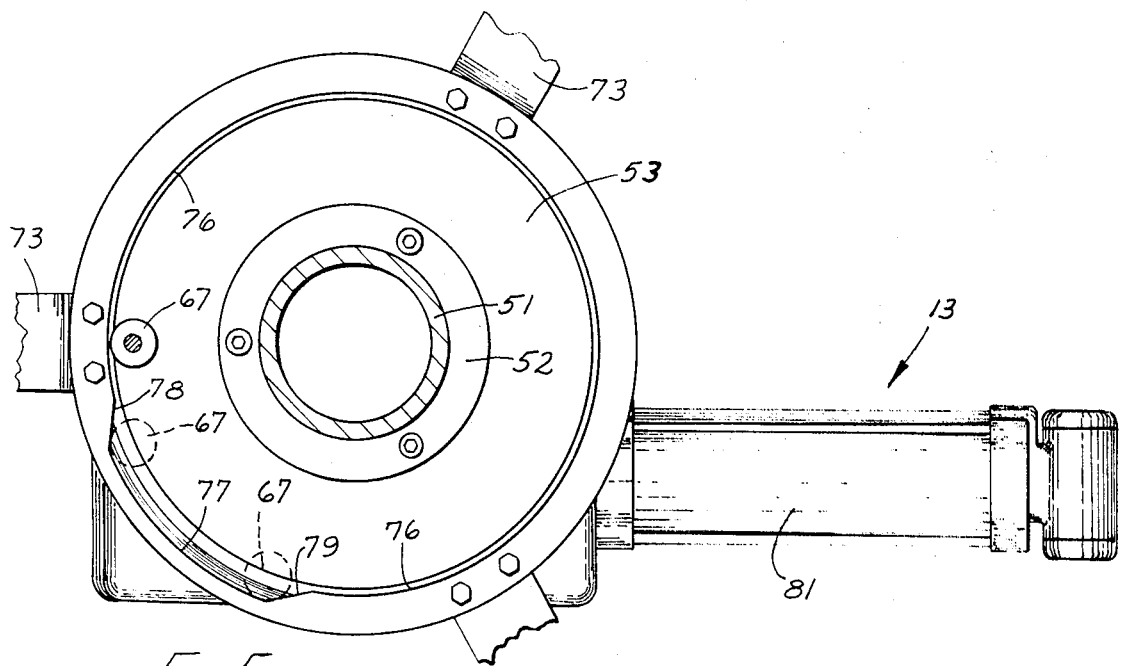
FIG. 5 is a plan view taken substantially along the line V—V of FIG. 4.
Figure 6:
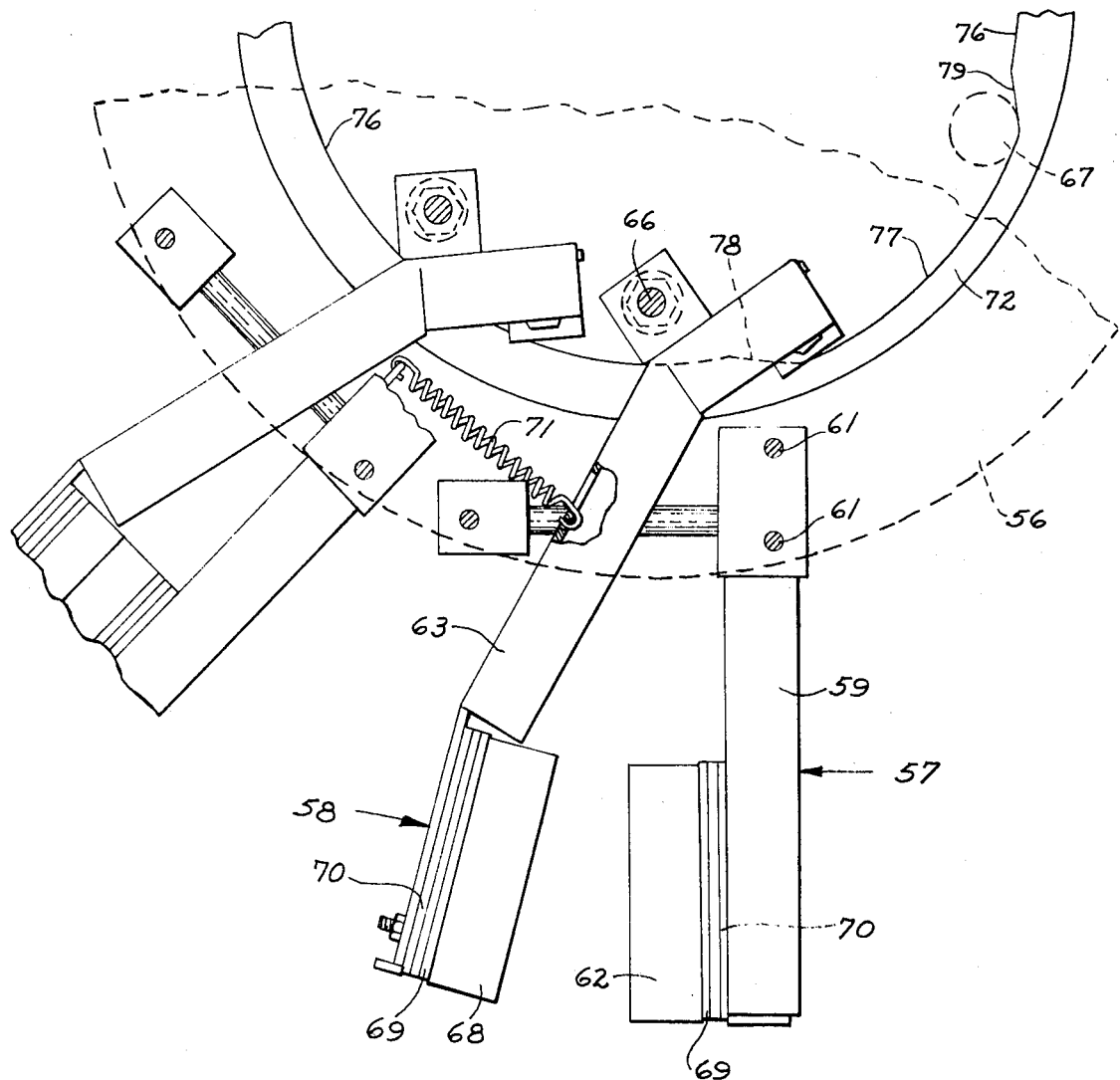
FIG. 6 is a partial top view illustrating the mounting of one of the clamping devices, the top mounting plate of the turret being illustrated by dotted lines.

The clamping mechanism 12 is rotatably stepped or indexed unidirectionally (clockwise in FIG. 2) through a plurality of stations, which stations have been succesively designated as A through H in FIG. 2. Station A is a feed or inlet station, while station B is an idle station. Station C is a cutting station and a top cutting device 16 is provided adjacent the clamping mechanism 12 for permitting the top of a spike to be cut. Similarly, station D is also a cutting station and is provided with a bottom cutting device 17 for permitting the bottom or stem portion of the spike to be cut. Station E is a stripping station and is provided with a stripper device 18 which permits leaves and/or needles adjacent the stem portion of the spike to be removed. Station F is a wounding station whereby the stem portion of the spike comes into contact with a wounding device 19 for causing removal of the skin or bark from a portion of the stem. Station H is a solution, here hormone, application station and includes a solution applicator 21 for applying a hormone solution to the wounded stem portion of the spike. Station H is a discharge station for permitting the prepared and treated spike to be removed from the machine.

Considering now the structural details of the machine 10, and particularly the frame 11, same comprises a bottom wall or base 31 extending between a plurality of sidewalls 32, 33, 36 and 37. The sidewalls are connected by a plurality of vertically extending legs 38 which are adapted to support the machine 10 on any suitable supporting surface. The sidewalls are preferably provided with wire screening 39 to provide a protective enclosure for the machine.

The sidewall 32 (FIG. 3) is provided with a frame element 41 thereon which defines a substantially L-shaped opening 42 therein, which opening 42 is provided with a vertically enlarged portion 43 positioned substantially adjacent station A. A Z-shaped bracket 46 is fixedly secured to the frame element 41 and has a portion thereof spaced from the frame element 41 to define a pair of spaced surfaces which act as a rest or supporting area for the spikes S which are to be inserted into the machine 10. The sidewall 32 is further provided with a discharge opening 47 therein laterally spaced from the inlet opening 42. The discharge opening 47 is positioned in alignment with the discharge station H.

The clamping mechanism 12 is positioned above the bottom wall 31 and includes a substantially cylindrical, vertically extending post 51 having an annular flange 52 fixedly secured to the lower end thereof. The flange 52 is rotatably supported upon a cup-shaped housing 53 stationarily supported on the bottom wall 31. The post 51 is further provided with an enlarged annular top plate 56 secured thereto, which top plate supports thereon a plurality of pairs of clamp members 57–58. The illustrated clamping device 12 is provided with eight pairs of clamp members 57–58 thereon in correspondence with the eight stations A–H provided by the machine.

The clamp member 57 (FIG. 6) is stationary relative to the top plate 56 and includes an arm 59 which extends substantially radially outwardly from the top plate 56, the arm 59 being secured to the top plate 56 by a pair of bolts 61. A block-like clamping jaw 62 is secured to the arm 59 adjacent the free or outer end thereof.

The clamp member 58, on the other hand, is mounted for pivotal movement relative to the top plate 56. Specifically, the clamp member 58 includes a lever arm 63 which is pivotally connected intermediate its ends to the top plate 56 by means of a bolt 66. The inner end of the lever arm 63 is provided with a roller-type cam follower 67 (FIG. 4) rotatably supported thereon, whereas the outer end of the lever arm 63 is provided with a block-like clamping jaw 68 thereon, which clamping jaw 68 is positioned in opposing relationship to the clamping jaw 62. The clamping jaws 62 and 68 are preferably of a resilient nonmetallic material, preferably an elastomeric material such as foam rubber of low durometer values, to permit the delicate nursery spikes to be securely clamped therebetween without damaging the spikes. The clamping pads 62 and 68 are preferably cemented or bonded to backing plates 69, which backing plates are then fixedly secured to the arms 59 and 63, respectively, by any suitable means, such as screws. Also, suitable shims or spacers 70 can be provided between the backing plate and the arm, if necessary, to insure that the clamping pads 62 and 68 properly mate and provide the desired clamping pressure when in the closed position.

To control the pivotal movement of the movable clamp member 58, there is provided an annular cam ring 72 (FIGS. 4-6), which cam ring is supported in upwardly spaced relation from the bottom wall 31 by a plurality of leg members 73. The cam ring 72 is positioned concentric with and in surrounding relationship to the post 51 but is stationarily fixed relative to the frame of the machine. The annular cam ring 72 is provided with an internal cam profile thereon which includes first and second cam surfaces 76 and 77, both of which are of substantially constant radius about the axis of the post 51, the cam surface 76 being of slightly smaller radius than the cam surface 77. The first or inner cam surface 76 extends substantially around the periphery of the cam ring for approximately seven-eighths of the periphery thereof, whereas the second or outer cam surface 77 extends around the periphery of the cam ring for only approximately one-eighth of the periphery thereof.

The inner and outer cam surfaces 76 and 77 are further interconnected by a sloped leading ramp 78 and a sloped trailing ramp 79 to permit a gradual transition between the cam surfaces 76 and 77. The ramps 78 and 79 are stationarily positioned substantially adjacent the inlet station A and the discharge station H, respectively, for controlling the closing and opening movements, respectively, of the clamp pads 62 and 68. Specifically, each of the movable clamp members 58 has a tension spring 71 (FIG. 6) connected thereto, the other end of the tension spring being fixedly connected to the top plate 56. The tension spring 71 thus provides a continuous urging of the cam follower 67 into bearing engagement with the cam profile formed on the inner periphery of the annular cam ring 72. As the roller follower 67 moves from the inner cam surface 76 down the trailing ramp 79 onto the outer cam surface 77, the spring 71 causes the movable clamp member 58 to pivot into the open position. Similarly, when the cam roller 67 moves up the leading ramp 78 onto the inner cam surface 76, the clamp member 58 is caused to pivotally move to the closed position in opposition to the urging of the spring 71.

Considering now the drive means 13 utilized for rotatably indexing the clamping mechanism 12, the drive means 13 includes (FIGS. 4 and 5) a conventional fluid pressure cylinder 81, preferably a double-acting pneumatic cylinder, which includes a reciprocating piston rod 82 extending from one end thereof. A pawl 83 is pivotally mounted on the free end of the piston rod 82 and is continually biased by means of a spring (not shown) into continuous engagement with the teeth of a ratchet wheel 86, which ratchet wheel is nonrotatably secured to a shaft 87. Shaft 87 is rotatably supported within the cup-shaped housing 53 and has the upper end thereof nonrotatably secured to the annular flange 52 whereupon rotation of the shaft 87 also causes rotation of the post 51. The power cylinder 81 is provided with a suitable stroke length so that energization thereof causes one-eighth revolution of the clamping mechanism 12, same thus being moved from one station to the next adjacent station. The power cylinder is then energized in a reverse manner so as to return the piston rod 82 to its original retracted position. Drive means 13 is conventional and further description thereof is not believed necessary.

The structure associated with the top cutting station C, the bottom cutting station D, the stripping station E, the wounding station F and the hormone station G will be considered in detail below.

Station C.—Top cutting

The top cutting device 16 (FIGS. 7 and 8) is disposed under and radially inwardly of the clamping pads 62 and 68 substantially as illustrated in FIGS. 2 and 7 to permit cutting of the tip of the spike S, which spike has a tip portion $S_t$ which extends radially inwardly beyond the clamping pads in a direction toward the rotational axis of the post 51. Specifically, as illustrated in FIGS. 7 and 8, the top cutting device 16 includes a housing 91 which includes a pair of substantially parallel uprights 92 and 93 which are fixedly connected at their lower ends to a base 96. The base 96 is suitably secured to the bottom wall 31 by means of a plurality of bolts 97, which bolts extend through a pair of elongated slots 98 (FIG. 2) formed in the bottom wall 31 to permit the top cutting device 16 to be fixedly secured relative to the frame in a selected radial position.

The housing 91 further includes a pair of cross members 99 which extend between and are fixedly connected to the uprights 92 and 93. The cross members 99 have a power cylinder 101 fixedly secured thereto, the power cylinder 101 preferably being a pneumatic fluid pressure cylinder. The power cylinder 101 has a piston rod 102 extending vertically from the upper end thereof, which piston rod is threadedly connected to a mounting member 103. A blade 106 is fixedly secured to the mounting member 103 by a plurality of bolts 107, which bolts extend through an elongated slot 108 to permit the vertical position of the blade to be adjusted relative to the mounting member 103.

The blade 106 is formed with an upper cutting edge 109 which is adapted to move toward and away from a stationary cutting block 113, which cutting block is positioned within a channel-shaped member 111 fixedly secured to and extending between the upper ends of the uprights 92 and 93. The upper ends of the uprights are also provided with recesses 112 therein to provide clearance for the tip portion $S_t$ of the spike when same is rotatably moved into position, whereupon energization of the power cylinder 101 will cause the blade 106 to move upwardly into contact with the cutting block 113, thereby cutting or severing the tip portion $S_t$ from the remaining portion of the spike. The cutting block 113 is preferably constructed of a suitable nonmetallic material, such as wood, plastic or nylon, which will be able to withstand the impact of the cutting blade thereon without dulling the cutting edge 109. The top cutting device is also preferably provided with a guide bar 114 to insure that the tip portion $S_t$ of the spike will be properly positioned underneath the cutting blocking as illustrated in FIG. 7.

Station D.—Bottom cutting

Figure 10:
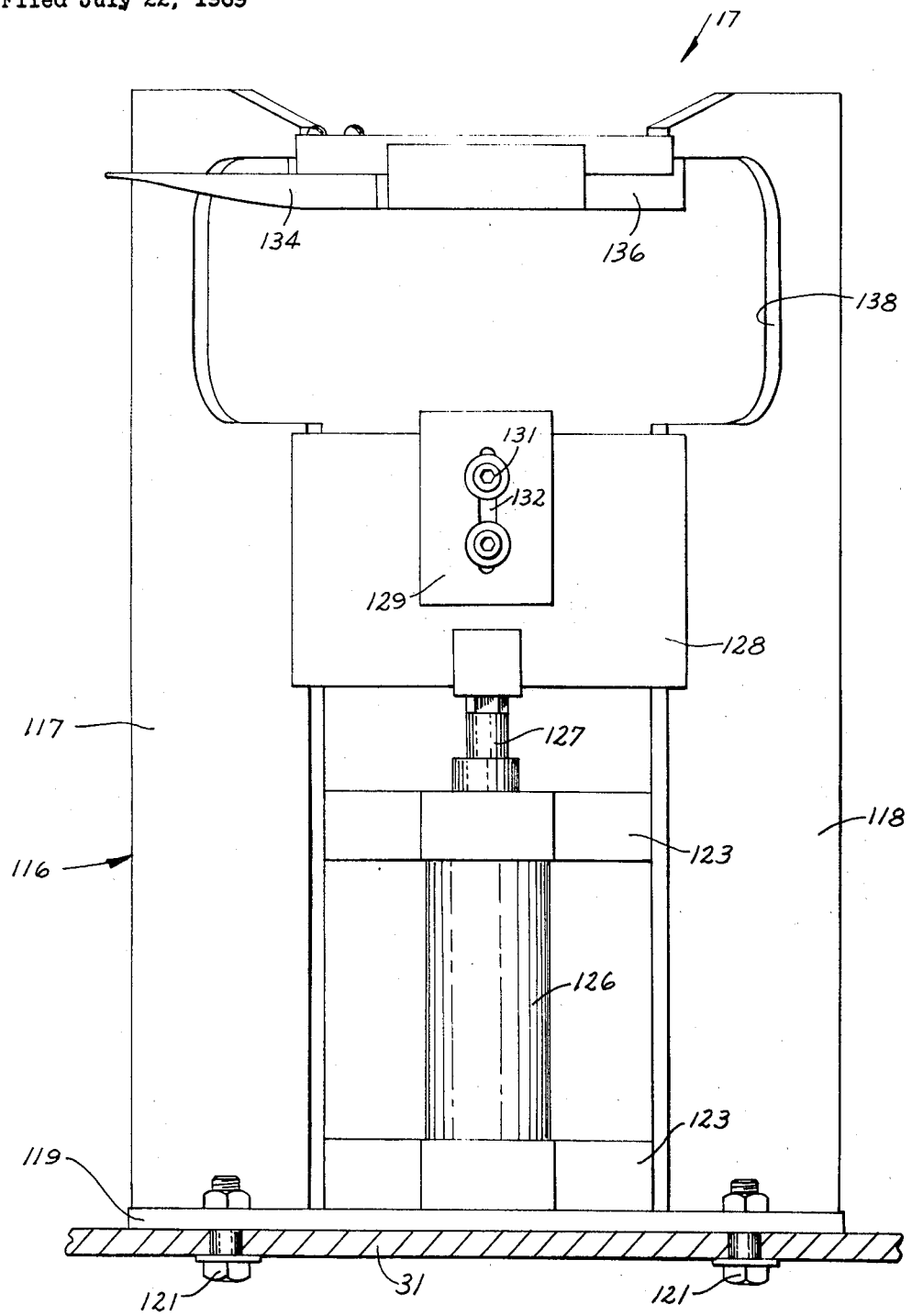
FIG. 10 is an elevational view taken substantially along the line X—X of FIG. 9.

The bottom cutting device 17 (FIGS. 9 and 10) is positioned below and radially outwardly of the clamping pads 62 and 68 so as to permit the outer or bottom end of the spike to be severed. The bottom or stem portion $S_b$ of the spike extends radially outwardly beyond the extremities of the clamping pads 62 and 68 to permit same to be engaged and cut by the cutting device 17 substantially in the manner as illustrated in FIGS. 2, 9 and 10.

Specifically, the stem or bottom cutting device 17 includes a housing 116 which has a pair of uprights 117 and 118 connected at their lower ends to a base member 119, the uprights as illustrated extending radially outwardly at an angle relative to one another. The base member 119 is fixedly securable to the bottom wall 31 by a plurality of bolts 121, which bolts extend through a pair of elongated slots 122 (FIG. 2) formed in the bottom wall 31 to permit the radial position of the stem cutting device 17 to be easily adjusted.

The housing 116 further includes a pair of cross members 123 extending between and fixedly connected to the uprights 117 and 118, the cross members having a power cylinder 126 fixedly secured thereto, the power cylinder preferably being a conventional pneumatic fluid pressure cylinder. A piston rod 127 extends from the upper end of the power cylinder and is threadedly connected to a mounting plate 128, which mounting plate has a blade member 129 secured thereto by a plurality of bolts 131. The bolts 131 extend through an elongated slot 132 to permit the blade 129 to be adjustably vertically positioned on the mounting member 128.

The blade 129 has an upper cutting edge 130 which is adapted to move toward and away from a stationary cutting block 139. The cutting block 139 is fixedly but removably positioned within a channel member 136 which extends between and is fixedly secured to the upper ends of the uprights 117 and 118. The cutting block 139 is held within the channel member 136 by means of clamping screws 137. The cutting block 139, like the block 113 used in the top cutting device 16, is preferably of a nonmetallic material, such as wood, nylon or plastic, to prevent dulling the cutting edge 130.

The upper ends of the uprights 117 and 118 are further provided with enlarged recesses 138 therein for providing clearance for the stem portion $S_b$ of the spike when same is rotatably moved from station C to station D. Further, a guide cam bar 134 is fixedly secured to the channel member 136 and extends outwardly in a direction toward station C so as to cause the bottom portion $S_b$ of the spike to be deflected downwardly adjacent the cutting block 136 when the spike S is moved into station D.

The bottom cutting device 17 is preferably mounted on the bottom wall 31 of the frame 11 by any conventional means for permitting the bottom cutting device 17 to be angularly adjusted relative to the longitudinally extending direction of the spike so as to permit the bottom or stem of the spike to be cut at a selected angle.

Station E.—Stripping

The stripper device 18 (FIGS. 11–13) is positioned radially outwardly of the clamp pads 62 and 68 and is adapted to engage the exposed stem portion $S_b$ of the spike, which portion extends radially outwardly beyond the clamp pads to permit the needles or leaves to be stripped from a predetermined length of the stem.

The stripper device, as illustrated in FIGS. 11–13, has a frame 141 which includes a pair of spaced uprights 143 fixedly connected to and extending upwardly from the base 31, the upper ends of the uprights 143 being fixedly interconnected by a pair of lower cross members 146. A pair of spaced, substantially parallel side rails 147 are fixedly connected to the lower cross members 146. The side rails 147 are each elongated and extend substantially radially inwardly toward the clamping mechanism 12. A further pair of upper cross members 148 extend between and are fixedly connected to the side rails 147, a power cylinder 149 being fixedly secured to the upper cross members 148. The power cylinder 149, which is preferably a conventional double-acting pneumatic cylinder, has a piston rod 151 which extends from the inner end thereof. The piston rod 151 is connected to a substantially U-shaped frame 152 slidably mounted on the spaced side rails 147. The U-shaped frame 152 has a central portion 153 connected at its midpoint to the piston rod 151 and connected at its opposite ends to a pair of inwardly extending leg members 154, which leg members 154 are slidably received on the side rails 147.

Each leg member 154 has a power cylinder 156 fixedly secured thereto substantially adjacent the free end thereof. Each power cylinder 156, preferably a conventional pneumatic fluid pressure cylinder, has a piston rod 157 extending therefrom whereby the piston rods 157 of the pair of cylinders 156 are substantially coaxially aligned and opposed to one another as illustrated in FIG. 11. Further, the piston rods 157 are slidably mounted for reciprocating movement in a direction substantially transverse to the radially extending direction of the spike S when same is positioned at station E.

Each piston rod 157 has an L-shaped bracket 158 fixedly secured thereto, a stripper jaw 161 or 162 being secured to each L-shaped bracket 158 by any suitable means, such as screws or bolts. Each stripper jaw is provided with an elongated slot 159 (FIG. 13) therein to permit the jaws to be adjusted toward and away from each other relative to their respective mounting brackets 158. The stripper jaws 161 and 162 have tapered portions 163 and 164, respectively, with the tapered portion 163 extending radially inwardly whereas the tapered portion 164 extends radially outwardly to permit the two tapered portions to overlap (as illustrated in dotted lines in FIG. 11) when the jaws are moved together into surrounding relationship with the stem portion of the spike.

The stripper jaws 161 and 162 are also preferably provided with a notch 166, preferably V-shaped, for permitting the jaws to be moved into surrounding relationship with the stem portion of the spike, whereupon the walls defining the notches will substantially completely surround the stem to permit leaves or needles to be removed when the closed stripper jaws are moved radially outwardly relative to the stem. The stripper jaws 161 and 162 may be constructed of a rigid material, such as metal, or, alternatively, they may be constructed of a nonmetallic resilient material, such as rubber. The exact material utilized for the stripping jaws depends upon the type of spike being utilized and the sensitivity of the spike to damage.

Each mounting bracket 158 is further fixedly connected to a tie member 167 which extends rearwardly in a direction substantially parallel with the side rail 147, each tie member 167 in turn being fixedly connected to a guide rod 168 which slidably extends through an opening formed in the adjacent side rail 147. The guide rods 168 are substantially parallel to their respective piston rods 157 to provide additional support and rigidity for the stripping jaws when the piston rods are moved to their extended positions, that is, when the jaws are moved to the closed overlapped position.

FIGS. 17 and 18 illustrate therein a preferred modification of the stripper jaws which can be utilized on the stripping device 18. Specifically, the stripper jaws 161' and 162' are again connected to the piston rods 157 but, rather than extending substantially parallel with the axis of the piston rods as in the embodiment of FIG. 11, the jaws 161' and 162' are each angularly inclined relative to the axis of the piston rods 157 and relative to the longitudinal direction of the spike preferably at an angle of approximately 45°. By having the jaws extend at an angle of approximately 45° relative to the longitudinal direction of the spike, the jaws cause the needles on the spike to be easily bent back so as to overstress the leaves or needles whereby they can be easily stripped off of the spike. The jaws are provided with tapered clamping faces 163' and 164' thereon which are adapted to abuttingly contact one another to grip the stem portion $S_b$ of the spike therebetween as illustrated by the dotted line position of FIG. 17.

The jaws 161′ and 162′ are preferably constructed of a resilient material, such as foam rubber, since use of such a resilient material permits the tapered abutment faces 163′ and 164′ to be substantially straight, as illustrated in FIG. 18, without damaging the stem. The jaws 163′ and 164′ are preferably provided with a plurality of adjacent cuts or slits 165 therein, which slits extend across the width of the faces 163′ and 164′. The slits may be approximately ¼ inch deep and spaced approximately ⅛ inch apart. Use of such slits permits the spike to easily enter into one of the slits so that the foam rubber of the jaws encircles the spike, thereby effectively permitting the spike to be stripped of needles or leaves. Alternatively, a small V-shaped notch 166′ can be formed in the abutment face to accommodate the stem of the spike if desired.

Station F.—Wounding

The wounding device 19 (FIGS. 14 and 15) is also positioned radially outwardly from the jaws 62 and 68 and is adapted to contact the stem portion $S_b$ of the spike S after the stem portion has been cut and stripped by the cutting and stripping devices 17 and 18 located at stations D and E, respectively.

The wounding device 19 includes a base plate 171 connected to the bottom wall 31 by a plurality of bolts 172, which bolts extend through elongated slots 173 formed in the base plate 171 for permitting the wounding device to be radially adjustably positioned as desired.

A lift plate 176 is pivotally connected at one end thereof by a hinge 177 to the rearward end of the base plate 171 for permitting the lift plate 176 to be vertically pivotally moved to a selected angular position relative to the associated clamping jaws. To permit the lift plate 176 to be secured in a selected angular position, there is provided an elongated lever 178 which is hingedly connected by a pivot pin 179 adjacent its lower end to the base plate 171, the lever 178 being provided with an elongated slot 181 extending throughout the length thereof. A clamping screw 182 extends through the slot 181 and is in engagement with the lift plate 176 for permitting same to be fixedly secured in a selected angular position.

The lift plate 176 is further provided with a motor mounting plate 183 thereon, which motor mounting plate has a motor 186 fixedly positioned thereon. The motor 186 drives a shaft 187 having an annular support member 188 fixedly secured to the free end thereof. The exposed axial end face of the annular support member 188 is provided with a conventional abrasive disk 189 thereon, which abrasive disk is adapted to contact the stem of the spike for wounding same. The motor mounting plate 183 is secured to the lift plate 176 by a plurality of bolts 192 which extend through slots 191 (FIG. 2) formed in the motor mounting plate for permitting the motor 186 to be adjustably positioned as desired.

The wounding device 19 is further provided with a guide means 193 for insuring that the stem of the spike S will properly contact the abrasive disk 189. The guide means 193 includes an upright support member 196 having an elongated guide member 197 fixedly secured to the upper end thereof, which guide member 197 is substantially U-shaped and extends outwardly from station F toward station E so that the guide member will, if necessary, engage the stem of the spike and cause same to be deflected into contact with the axial end face of the abrasive disk 189. The lower end of the upright support member 196 is also adjustably secured to the bottom wall 31 by a plurality of bolts 198 which extend through an elongated slot 199 formed in the bottom wall 31.

Station G.—Solution application

The solution applicator 21 of station G is also positioned radially outwardly from the clamping jaws 62 and 68 and is adapted to apply a hormone or other suitable treatment solution to the wounded area of the spike. The solution applicator 21, as illustrated in FIG. 16, includes a supporting stand or frame 201 which is stationarily supported upon the bottom wall 31. The stand is preferably fixedly secured to the bottom wall 31 by a plurality of bolts 202 which extend through elongated slots 203 (FIG. 2) to permit the stand to be selectively radially positioned relative to the adjacent clamping pads 62 and 68. The stand 201 is provided with a tank or tray 206 on the upper end thereof, which tank 206 contains a supply of suitable liquid treating solution, such as a hormone solution therein. A wick or sponge-like member 207 is provided adjacent the tray 206 and has the lower end thereof extending into the tank 206 so as to be immersed within the treating solution contained therein, the wick preferably being of a material which readily absorbs the solution contained within the tank 206. The upper end of the wick extends into the path of movement of the spike S as same is moved from station F to station G so that the stem of the spike will contact the wick at station G to cause a quantity of treating solution to be applied to the wounded area of the stem. A guide device 208, identical to the guide device 193 described above, may be provided if desired to insure that the wounded area of the stem properly contacts the wick.

The illustrated solution applicator 21 located at station G may alternately be replaced by a hormone applicator system having a pump for supplying a continuously flowing stream of hormone solution with the solution being deposited into a catch basin, the solution in the catch basin being recirculated through the pump. Such a device can be positioned between a pair of working stations such that the stem of a spike passes through the flowing stream of solution as the stem is moved from one working station to an adjacent working station.

OPERATION

The operation of the device embodying the invention will be described in detail hereinbelow for a better understanding thereof.

With the cutting making machine 10 in the position illustrated in FIG. 2, a spike S will be positioned, manually in this embodiment, between the pair of open clamping pads 62 and 68 positioned at station A, the inner or top of the spike extending beyond the radially inner end of the clamping pads with the bottom or stem portion of the spike being deposited on the support surface as defined by the frame element 41 and the Z-shaped bracket 46. The main fluid pressure cylinder 81 is then energized to move the piston rod 82 to an extended position, which in turn causes a rotary stepping movement of the clamping mechanism 12 whereby the clamping jaws 62 and 68 located at station A are rotatably moved to station B. However, as the clamping jaws are initially moved away from station A, the cam follower 67 contacts the leading cam ramp 78 whereupon the cam follower is moved upwardly from the outer cam surface 77 onto the inner cam surface 76, which in turn causes a pivotal movement of the movable clamp member 58 into the closed position whereupon the spike S is thus tightly and securely held between the clamp jaws 62 and 68. When the clamp jaws 62 and 68 reach station B, the piston rod 82 of the main pressure cylinder 81 is retracted to its original position, the clamping mechanism 12 remaining stationary during this retracting movement.

Since station B is in an idle station, no work or treatment is performed on the spike S. The main fluid pressure cylinder 81 is again energized to cause extension of the piston rod 82, whereupon the clamps 62 and 68 are rotatably stepped from station B to station C, the clamp jaws remaining stationary in station C while the piston rod 82 again retracts. While the clamp jaws 62 and 68 are stationarily positioned at station C, the power cylinder 101 of the top cutting device is energized to cause the blade 106 to move upwardly toward the cutting block 113, whereupon the top $S_t$ of the spike is severed. De-energization of the power cylinder 101 permits the blade 106 to move downwardly to its retracted position, either by means of gravity or by means of a return spring contained within the power cylinder.

The main power cylinder 81 is again energized to rotatably step the clamp jaws from station C to station D. With the clamp jaws 62 and 68 positioned at station D, the power cylinder 126 of the bottom cutting device 17 is energized to cause the blade 129 to move upwardly toward the cutting block 139, which upward movement causes a portion of the bottom or stem of the spike to be severed. The power cylinder 126 is then de-energized whereupon the blade 129 is returned to its lower retracted position, either due to gravity or by means of a return spring position within the power cylinder. Alternatively, the power cylinder 126 could be of the double-acting type if desired. After the stem has been cut, the main power cylinder 81 is again energized to rotatably advance the clamping jaws 62 and 68 from station D to station E.

When the spike is positioned at station E, and with the jaws 161 and 162 initially open, the outer end of the primary power cylinder 149 is energized to cause an extension of the piston rod 151, whereupon the U-shaped frame 152 is slideably moved inwardly (rightwardly in FIG. 11) from the solid line position to the dotted line position wherein the stripping jaws 161 and 162 are spaced outwardly on substantially opposite sides of the extending stem portion $S_b$ of the spike. The secondary power cylinders 156 are then simultaneously energized to cause their associated piston rods 157 to move inwardly toward one another, whereupon the stripper jaws 161 and 162 are moved into the overlapping position in surrounding relationship to the stem portion of the spike S, the stem portion extending through the opening as defined by the overlapping V-shaped notches 166.

The secondary power cylinders 156 are then maintained in their extended positions, whereupon the inner end of the primary power cylinder 149 is energized to cause the piston rod 151 and the U-shaped frame 152 to slideably retract (leftwardly in FIG. 11), whereupon the jaws 161 and 162 are slideably moved outwardly along the stem of the spike S. This outward movement of the jaws causes any leaves or needles on the stem of the spike to be stripped or removed therefrom. When the piston rod 151 of the primary power cylinder 149 reaches its retracted position, then the secondary power cylinders 156 are de-energized to permit the jaws 161 and 162 to be returned to their retracted open position as illustrated by solid lines in FIG. 11.

After the stem of the spike has been stripped at station E, as above described, main power cylinder 81 is again energized to advance the clamp pads 62 and 68 with the spike S therebetween from station E to station F. As the spike S is moved to station F, the extending stem portion $S_b$ is received between the extending legs of the guide member 197, which guide member causes the end of the stem portion to be brought into contact with the axial end face of the abrasive disk 189. The abrasive disk 189 is rotated by the motor 186, which motor may be energized to rotate either continuously or during the periods when the clamping mechanism 12 is stationary. Irrespective of which mode of operation is selected, the rotation of the abrasive disk 189 causes the bark or skin on the stem of the spike to be removed, resulting in a substantial exposed area, generally referred to as the wound area.

The main power cylinder 81 is then again energized to rotatably step the spike from station F to station G, whereupon the wound area on the stem of the spike comes into contact with the wick 207, which wick has absorbed therein a substantial quantity of treating solution, some of which is thus applied to the wound area on the stem.

Main power cylinder 81 is once again energized to rotatably advance the spike from station G to discharge station H. As the clamping mechanism 12 approaches station H, the cam roller 67, due to the urging of the tension spring 71, rotatably moves down the trailing ramp 79 into rotatable engagement with the outer cam surface 77. This movement of follower 67 causes a pivotal movement of the movable clamp member 58, same being pivotally moved from the closed position to the open position whereupon the clamp pad 68 moves away from the clamp pad 62, thereby permitting the spike to be deposited onto the botton wall 31 of the frame 11. The prepared and treated spike is then removed from the machine 10 through the discharge opening 47. The spike, having thus been prepared and treated, is then in condition for insertion into a suitable planting media so that same may then develop its own root system.

As is apparent from the above-described operation, the machine 10 according to the present invention permits large quantities of spikes to be rapidly and completely prepared so that same are in suitable condition for planting with a minimum amount of manual operation and manipulation. Further, the machine produces cuttings which are of extreme uniformity while at the same time the machine possesses sufficient adaptability and adjustability to prepare cuttings having different physical characteristics. For example, since both the top and bottom cutting devices 16 and 17 are mounted for radial adjustment relative to the clamping structure, the particular length of spike produced by the device can be easily selectively varied as desired. Further, the bottom cutting device is also easily angularly adjusted by suitable adjustment of its mounting means (in a manner not shown but which can be readily provided by those skilled in the art) to permit the stem to be cut either transversely or at a slant relative to the longitudinal direction of the spike. Further, the stripper device 18 permits a selective length of the stem to be stripped of leaves or needles so that same can be directly inserted in to planting media. The wounding device 19 is also selectively and easily adjustable so that same can be moved not only radially relative to the associated clamping jaws, but also the abrasive disk can be rotatably adjusted within a vertical radial plane so as to permit the end of the stem to be wounded either parallel to or at a slant angle relative to the longitudinal direction of the spike.

Further, the power clyinders 81, 101, 126, 149 and 156 are all preferably interconnected to a common pressurized source of and are controlled by a common control system so that the respective fluid pressure power cylinders will be automatically actuated, whereby all of the operations carried out at stations C, D, E, F and G will be automatically and simultaneously performed during the interval when the main power cylinder 81 is being retracted before advancing the clamping mechanism to the next station. Such pneumatic circuits and the controls therefor are well known and thus a detailed description thereof is not believed necessary.

If desired, the cutting making machine according to the present invention can be modified so that the treating sequence of the spike occurs through an angle of approximately 180°, thereby effectively doubling the output of the machine. For example, a spike could be loaded into the machine at station A. Suitable cutting devices, such as top cutting device 16 and bottom cutting device 17, could be located at station B whereupon both the top and bottom of the spike would be cut. Station C could be provided with a stripping device, such as the stripping device 18, and liquid hormone solution could be applied to the stem of the spike by means of a flowing stream supplied from a pump as the spike is moved from station C to station D, the spike being unloaded at station D. In a similar manner, station E could be utilized as a loading station, station F could be utilized for cutting the top and bottom of the spike, station G could be used for stripping the spike, and a liquid hormone could be applied between stations G and H, with station H also being used as an unloading station. In this manner, the production output of the machine could be doubled in comparison to the production output of the machine as illustrated in FIG. 2.

MODIFICATION

FIGS. 19 and 20 illustrate therein a modified cutting making machine 310 constructed according to at least some of the principles of the present invention. The machine 311 is a foot-operated device which only performs a cutting and stripping operation. The machine 311 is thus desirable for use when smaller quantities of cuttings are to be prepared, which smaller quantity would not necessarily demand a fully automated machine of the type illustrated in FIGS. 1–16.

The machine 311 comprises a housing 312 which includes a base plate 313 adapted to be supported on and secured to a suitable supporting surface, such as a floor. A channel-shaped post 314 is secured to the base plate 313 and extends vertically upwardly therefrom. The upper end of the post 314 is provided with a first L-shaped support member 316 fixedly secured thereto, which support member has a vertically extending flange portion 317, which flange portion has a slot (not shown) extending longitudinally thereof. The support member 316 also has a jaw mounting plate 318 fixedly secured to the front edge thereof. A first stripper jaw 319 is positioned adjacent the jaw mounting member 318 and is clampingly held thereagainst by means of a reinforcing plate 321, the jaw 319 and plate 321 being fixedly secured to the mounting plate 318 by a pair of screws 322. The screws 322 extend through elongated slots 323 formed in the reinforcing plate 321 and the stripper jaw 319 to permit the stripper jaw to be laterally adjusted as desired.

The stripper jaw 319 is adapted to cooperate with a similar stripper jaw 326, same being mounted on a second substantially L-shaped support member 327 in substantially the same manner as the stripper jaw 319 is mounted on the first support member 316.

The second support member 327 is fixedly secured to the upper end of an L-shaped lever 328 which is pivotally connected to the post 314 by means of a pivot pin 329. The lever 328 is pivotally movable from an open position (as illustrated in dotted lines in FIG. 19) to a closed position (as illustrated in solid lines in FIG. 19) so as to move the stripper jaw 326 into abutting engagement with the stripper jaw 319 to permit a spike to be engaged between the abutting edge surfaces 331 and 332 formed on the stripper jaws 319 and 326, respectively.

The stripper jaw 326 is normally maintained in the open position by means of a spring 333 which is fixedly connected at one end thereof to the post 314, the spring being connected at its other end to the apex portion of the lever 328.

To cause the stripper jaw 326 to be moved to the closed position, the end of the horizontal arm portion 334 of the lever 328 is pivotally connected, by means of pivot pin 336, to the upper end of a tie rod 337, the lower end of the tie rod being pivotally connected by means of a pin 338 to a foot-operated lever 339.

The foot-operator lever 339 comprises an elongated arm member 341 movably positioned within a channel formed between a pair of L-shaped bracket members 342 and 343, which bracket members are fixedly secured to the base plate 313. The rearward end of the arm member 341 is pivotably connected to the vertical flanges of the brackets 342 and 343 by a pivot pin 346. The forward end of the arm member 341 has a foot pedal 347 fixedly secured thereto, the tie rod 337 being pivotally connected to the arm member 341 at a point directly adjacent the foot pedal 347. The foot pedal 347 is normally maintained in a raised position due to the urging of the spring 333.

The machine 311 is also provided with a cutting block 351 (FIG. 20) fixedly secured to the first support member 316. The cutting block 351, preferably constructed of wood or nylon, is held between a bearing plate 352 and the projecting leg of an L-shaped mounting member 353, which mounting member 353 is fixedly positioned adjacent the vertical flange 317. The mounting member 353 also has a block 356 secured thereto having a tightening screw 357 threadedly engaged therewith, which screw 357 abuts against the bearing plate 352 for clamping the cutting block 351 in position. The mounting member 353 is secured to the vertical flange 317 by a pair of screw members 358, which screw members extend through a pair of elongated parallel slots (not shown) formed in the vertical flange 317 to permit the cutting block to be selectively positioned as desired. For example, FIG. 20 illustrates in dotted lines the rearward-most position of the cutting block, the cutting block being selectively positionable at any intermediate location between the solid and dotted lines positions illustrated in FIG. 20.

To perform the actual cutting operation, the second support member 327 is provided with an L-shaped blade mounting member 361 fixedly secured to the vertical flange 362 thereof. The blade mounting member 361 has a cutting blade 363 fixedly secured to the projecting leg of the mounting member 361 by means of bolts 366. The cutting blade 363 is provided with a cutting edge on the free end thereof for cooperation with the cutting block 351 in the manner as illustrated in FIG. 20. The blade mounting member 361 is fixedly secured to the vertical flange 362 by means of a pair of bolts 367, which bolts extend through a pair of elongated slots (not shown) extending longitudinally of the vertical flange 362 so as to permit the blade to be adjustably positioned as desired, the blade being positionable at any location between the solid and dotted line positions illustrated in FIG. 20.

To operate the machine 311, which machine is normally maintained in the open dotted line position illustrated in FIG. 19, the operator first positions a spike in the machine by manually holding the spike so that the bottom or stem portion thereof extends between the stripper jaws 319 and 326 and between the blade 363 and the cutting block 351. The operator then holds the spike in this position and steps on the foot pedal 347 so as to depress same, which in turn causes a downward movement of the connecting rod 337 whereupon the lever 328 is pivotally moved (clockwise in FIG. 19) to the closed position, which movement causes the cutting blade 363 to come into contact with the cutting block 351 so as to sever the end of the spike. The pivotable closing movement of the lever 328 also causes the stripper jaw 326 to be moved into substantial engagement with the stripper jaw 319 whereby the stem portion of the spike is held between the adjacent faces 331 and 332. The operator maintains the pedal 347 in its depressed condition and then pulls the spike straight out from between the stripper jaws, which pulling action causes the stripper jaws 319 and 326 to remove the unwanted leaves or needles from the stem portion of the spike. The operator then removes his foot from the pedal 347 whereupon the spring 333 again returns the machine to its open position to permit the above-described operation to be repeated.

The operation as described above thus causes the stem of the spike to be cut and immediately thereafter permits a selected length of the stem to be stripped of foliage. The length of stem which is to be stripped of foliage can be easily and selectively adjusted by loosening the mounting bolts 358 and 367 so as to permit the cutting block 351 and cutting blade 363 to be slideably moved relative to their respective vertical flanges 317 and 362, thereby varying the distance between the blade 366 and the stripping faces 331 and 332.

The embodiments of the invention in which I claim an exclusive property or privilege are defined as follows:

1. An apparatus for preparing nursery cuttings, comprising:

clamp means including a rotatable clamp housing and a plurality of pairs of relatively movable clamping jaws mounted thereon;

drive means coacting with said clamp housing for rotatably stepping same through a plurality of circumferentially spaced working stations;

cutting means positioned at a first working station with said cutting means including a movable cutting member adapted to sever the stem of a cutting when said cutting is positioned in said first working station; and stripper means positioned at a second working station circumferentially spaced from said first working station for stripping a portion of said cutting.

2. An apparatus according to claim 1, further including wounding means positioned at a third working station circumferentially spaced from said first and second working station, said wounding means being adapted to contact the stem of said cutting when said cutting is positioned at said third working station for creating a wound area thereon.

3. An apparatus according to claim 2, wherein said wounding means includes a rotatable abrasive member adapted to contact the stem of said cutting for creating a wound area thereon, and means adjustably mounting said rotatable abrasive member for permitting the position of said abrasive member relative to said cutting to be selectively varied.

4. An apparatus according to claim 1, further including applicator means positioned circumferentially spaced from said first and second working stations, said applicator means being adapted to apply a treating material to the stem of the cutting.

5. An apparatus according to claim 1, said clamp means further including cam means coacting with said clamping jaws for causing relative movement thereof between open and closed positions.

6. An apparatus according to claim 5, further including second cutting means for severing the top end of the cutting when same is held by a pair of clamping jaws.

7. An apparatus according to claim 1, wherein said stripper means includes a slideable frame and first power means connected to said slideable frame for reciprocating same in a substantially radial direction relative to said rotatable clamp housing, said stripper means including a pair of stripper jaws slideably mounted on said slideable frame for reciprocating movement in a direction substantially transverse to said radial direction, and second power means for causing reciprocation of said stripper jaws in opposition to one another, said stripper jaws being movable relative to one another to engage the stem of said cutting when said slideable frame is in its radially innermost position, whereby energization of said first power means moves said frame radially outwardly for causing said stripper jaws to slideably move along the stem of said cutting so as to remove foliage therefrom.

8. An apparatus according to claim 1, wherein said clamping jaws are constructed of resilient nonmetallic material for permitting nursery cuttings to be clamped therebetween without damaging same.

9. A device according to claim 1, wherein said stripper means includes a pair of stripper jaws mounted for relative movement between an open position wherein the jaws are spaced from one another and a closed position wherein the jaws engage said cutting for causing foliage to be stripped from a portion of said cutting.

10. An apparatus according to claim 9, wherein said stripper jaws each extend at an angle of approximately 45° relative to the longitudinally extending direction of said cutting when said cutting is engaged with said jaws.

11. An apparatus for preparing nursery cuttings, comprising:

stationary frame means;

first and second mounting members and means mounting said first and second mounting members on said frame means for permitting relative movement therebetween;

said first and second mounting members having first and second stripper jaws, respectively, mounted thereon;

said first mounting member further having a cutting blade mounted thereon, and said second mounting member having a cutting block mounted thereon adapted to cooperate with said cutting blade; and actuator means connected to said mounting means for causing relative movement between said first and second mounting members with said mounting members being movable between open and closed positions, said stripper jaws being in substantial contact with one another and said blade being in substantial contact with said cutting block when said first and second mounting members are in said closed position.

12. An apparatus according to claim 11, wherein said cutting blade and cutting block are adjustably mounted on their respective mounting members and are aligned with and laterally spaced a predetermined distance from said stripper jaws.

13. An apparatus according to claim 11, wherein one of said first and second mounting members is fixedly secured to said frame means, the other of said first and second mounting members being pivotally mounted on said frame means for movement toward and away from said one mounting member.

14. An apparatus according to claim 13, wherein said mounting means includes a lever arm pivotally connected to said frame means and having said other mounting member fixedly secured thereto; said actuator means including a foot-operated pedal and linkage means connected between said foot-operated pedal and said lever arm for causing pivotable movement of said other mounting member; and means for normally urging said other mounting member and said lever arm toward said open position.

References Cited

UNITED STATES PATENTS

| | | | |
|---|---|---|---|
| 773,743 | 11/1904 | Von Hoffmann | 47—1 |
| 2,219,654 | 10/1940 | La Fata | 47—6 |
| 2,368,420 | 1/1945 | Masunaga | 47—6 |
| 2,592,833 | 4/1952 | Swanson | 47—1 |
| 2,611,215 | 9/1952 | Johnson | 47—1 |
| 2,806,325 | 9/1957 | Fox | 47—1 |

ROBERT E. BAGWILL, Primary Examiner

U.S. Cl. X.R.

47—6